United States Patent
Lee et al.

(10) Patent No.: US 10,185,851 B2
(45) Date of Patent: Jan. 22, 2019

(54) READER IN RFID SYSTEM, OPERATING METHOD OF THE READER, TAG DEVICE, AND OPERATING METHOD OF THE TAG DEVICE

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Yunmin Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/498,616

(22) Filed: Apr. 27, 2017

(65) Prior Publication Data
US 2017/0316235 A1    Nov. 2, 2017

(30) Foreign Application Priority Data

Apr. 27, 2016    (KR) .................. 10-2016-0051621

(51) Int. Cl.
*G06K 7/10* (2006.01)
*G06K 19/07* (2006.01)

(52) U.S. Cl.
CPC ..... *G06K 7/10366* (2013.01); *G06K 7/10009* (2013.01); *G06K 19/0723* (2013.01)

(58) Field of Classification Search
CPC ........... G06K 7/10266; G06K 7/10009; G06K 19/0723
See application file for complete search history.

(56) References Cited

U.S. PATENT DOCUMENTS

| 8,085,131 B2 | 12/2011 | Park et al. |
| 2008/0150674 A1* | 6/2008 | Park ............... H04W 28/06 340/3.41 |

FOREIGN PATENT DOCUMENTS

| KR | 10-2012-0133247 A | 12/2012 |
| KR | 10-2013-0042222 A | 4/2013 |

OTHER PUBLICATIONS

Sheng, Bo, and Chiu C. Tan. "Group authentication in heterogeneous RFID networks." Homeland Security (HST), 2012 IEEE Conference on Technologies for. IEEE, 2012.
Kim, Yunmin., et al. "Table-Based Identification Protocol of Computational RFID Tags" Computer Science & Information Technology, Seventh International Conference on Networks & Communications (NETCOM 2015), Dec. 2015.

* cited by examiner

*Primary Examiner* — Kristy A Haupt
(74) *Attorney, Agent, or Firm* — NSIP Law (57) ABSTRACT

Disclosed herein is an operating method of a reader in a radio frequency identification (RFID) system. In the method, a reader operates in a tag information collection mode in which tag information is collected from a plurality of tags and a tag recognition mode in which a frame of a predetermined size calculated according to the number of tags operating in each frame is allocated based on the tag information and at least some of the plurality of tags are recognized.

21 Claims, 11 Drawing Sheets

| Environment parameter | Value |
|---|---|
| Simulation plane | 5m × 5m |
| Number of CRFID tags | 200~300 |
| Maximum value of operation cycle | 3, 6 |
| Processing delay time | 0.4 ms |
| Length of time slot | 1 ms |
| Size of transmission data | 96 bits |

READER IN RFID SYSTEM, OPERATING METHOD OF THE READER, TAG DEVICE, AND OPERATING METHOD OF THE TAG DEVICE

CROSS-REFERENCE TO RELATED APPLICATIONS

This application claims the benefit under 35 USC 119(a) of priority of Korean Patent Application No. 10-2016-0051621 filed on Apr. 27, 2016 in the Korean Intellectual Property Office, the entire disclosure of which is incorporated herein by reference for all purposes.

BACKGROUND

1. Field

The following description relates to a radio frequency identification (RFID) system and, more particularly, to a reader for efficiently recognizing a tag in an RFID system environment, an operating method of the reader, a tag device, and an operating method of the tag device.

2. Description of the Related Art

A computational RFID (CRFID) tag is a device of a form in which a sensor and a computational capability have been assigned to an existing RFID tag, and has an advantage in that the existing RFID function can be extended and used. Existing RFID tag only transmits identification (ID) information for recognition, whereas a CRFID tag can sense a surrounding environment, convert the sensed results into data, and notify a reader of the data.

However, such a CRFID tag does not have an efficient data frame structure because sensing information has to be processed and transmitted along with additional electromagnetic energy for performing a sensing operation. That is, research so far reveals that the CRFID tag is problematic in that it is unsuitable and inefficient in transmitting information to the reader.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operating method of a reader in a radio frequency identification (RFID) system, includes the reader being configured to operate in a tag information collection mode in which tag information is collected from a plurality of tags and a tag recognition mode in which a frame of a predetermined size calculated based on the number of tags operating in each frame is allocated according to the tag information, and at least some of the plurality of tags are recognized.

The lengths of frames in the tag information collection mode and the tag recognition mode may be determined using different methods.

The size of a frame allocated in the tag information collection mode may be determined based on information about a predetermined number of the plurality of tags.

The tag information may include operation cycle information $e_i$ and processing delay time information $t_i$ about each of the tags.

The operation cycle information $e_i$ may be determined by electromagnetic energy amount for sensing data and the processing delay time information $t_i$ may be determined in accordance with the processing of sensing data in each tag.

The reader may operate in the tag information collection mode until all of the predetermined number of tags is successful in transmitting the tag information, and may switch to the tag recognition mode.

The reader may determine an optimum frame length and a marginal section length before a time slot starts in the tag recognition mode based on the tag information.

The reader may record the tag information collected from each of the tags in a table form.

In the tag recognition mode, the reader may determine an optimum frame length by calculating the number of all of tags having the operation cycle of an integer multiple based on the frame index i of an integer multiple based on operation cycle information about each of the tags.

In the tag recognition mode, the reader may determine the longest processing delay time of a tag of tags operating in a specific frame to be a marginal section length before a time slot starts.

A frame provided by the reader may include a slot which provides electromagnetic energy to the plurality of tags, a marginal section before a time slot starts, and slots which collect information from the plurality of tags.

In the tag information collection mode, each of the tags may transmit sensing data to the reader along with the tag information.

In another general aspect, there is provided a reader in a radio frequency identification (RFID) system, including a processor configured to receive tag information and a sensing data packet from a plurality of tags and determine one of a plurality of operation modes for receiving data from the tag and a frame size according to each of the operation modes. The processor operates in a tag information collection mode in which the tag information is collected or a tag recognition mode in which a frame of a predetermined size calculated based on the number of tags operating in each frame is allocated based on the tag information and at least some of the plurality of tags are recognized.

The processor includes an RFID communication unit configured to receive the tag information or the sensing data packet from the plurality of tags; and a control unit configured to determine one of the plurality of operation modes for receiving data from the tag and the frame size according to each of the operation modes, wherein the control unit operating in the tag information collection mode and the tag recognition mode are recognized.

In another general aspect, there is provided an operating method of a tag in a radio frequency identification (RFID) system, including receiving electromagnetic energy from a reader, generating tag information and/or a sensing data packet in accordance with a frame allocated by the reader, and transmitting the generated tag information and/or sensing data packet to the reader. The reader may control the tag information to be generated in accordance with a frame in the tag information collection mode of the reader and the sensing data packet to be generated in accordance with a frame in the tag information collection mode of the reader.

In each frame, the tag may receive electromagnetic energy from the reader and transmit tag information and/or a sensing data packet to the reader.

The tag information may include operation cycle information $e_i$ and processing delay time information $t_i$ about the tag. The tag information may be determined by electromagnetic energy amount for sensing data and by measuring a processing delay time taken to sense data and to packetize the sensed data.

In another general aspect, there is provided a tag device in a radio frequency identification (RFID) system, including an RFID communication unit configured to receive electromagnetic energy from a reader and to transmit tag information and/or a sensing data packet, a sensor unit configured to sense data based on the received electromagnetic energy, and a control unit configured to generate the tag information and/or the sensing data packet in accordance with a frame allocated by the reader. The control unit may perform control so that the tag information is generated in accordance with a frame in the tag information collection mode of the reader and the sensing data packet is generated in accordance with a frame in the tag information collection mode of the reader.

In another general aspect, there is provided a radio frequency identification (RFID) system including an RFID tag configured to receive electromagnetic energy from a reader, to transmit tag information and/or a sensing data packet, to sense data based on the received electromagnetic energy, to generate the tag information in accordance with a frame in a tag information collection mode of the reader, and to generate the sensing data packet in accordance with a frame in a tag information collection mode of the reader; and an RFID reader configured to receive the tag information and/or the sensing data packet from the RFID tag, to determine one of a plurality of operation modes for receiving data from the RFID tag and a frame size according to each of the operation modes, and to operate in tag information collection mode in which the tag information is collected and a tag recognition mode in which a frame of a specific size calculated according to a number of tags operating in each frame is allocated based on the tag information and at least some of the plurality of RFID tags are recognized.

In another general aspect, there is provided an operating method of a radio frequency identification (RFID) system, including allocating, by a reader, the predefined length of a frame corresponding to the number of tags capable of operating in a tag information collection mode to a plurality of tags, transmitting, by at least some of the plurality of tags, their own tag information to the reader in the frame of the tag information collection mode, switching, by the reader, to a tag recognition mode after receiving tag information from all of the tags, allocating a frame of the size corresponding to the number of tags operating in each frame to at least some of the plurality of tags based on the received tag information in the tag recognition mode, and generating, by some of the plurality of tags, sensing data in a packet form and transmitting the sensing data packet to the reader in the frame of the tag recognition mode.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
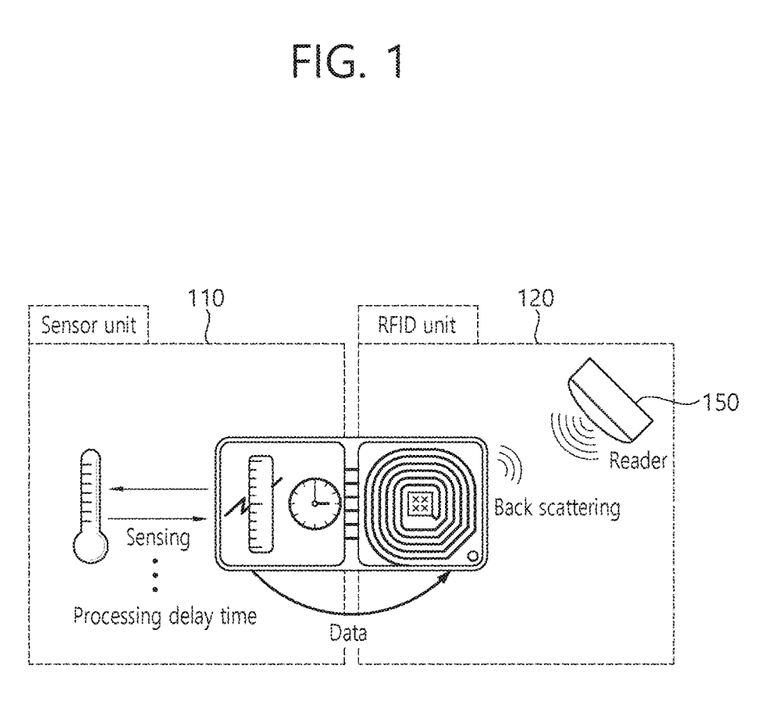
FIG. 1 is a concept view for illustrating a CRFID tag structure having a sensing and processing capability.

FIG. 1 is a concept view for illustrating a CRFID tag structure having a sensing and processing capability. As shown in FIG. 1, the CRFID tag includes a sensor unit 110 and an RFID unit 120.

Referring to FIG. 1, the sensor unit 110 may perform a sensing function, monitoring function, and image capturing and metering function for brightness, temperature, time, gravity, and pressure using electromagnetic energy received from a reader 150.

The RFID unit 120 back-scatters the signal of the reader and transmit or receive data to or from the reader 150. The RFID unit 120 transmits information about the ID of a tag, information related to the operation of the tag, and sensing information to the reader 150 using RFID.

The sensor unit 110 and the RFID unit 120 may be implemented using a single processor or different processors. Data sensed by the sensor unit 110 may be packetized so that it may be transmitted or received to or from the RFID unit 120.

Such a CRFID tag has, at least, an additional feature compared to an RFID tag not having a known computational capability for a sensing operation. First, the CRFID tag requires additional electromagnetic energy compared to the existing RFID tag because it generates data by sensing a surrounding environment. In particular, if different sensing operations (e.g., brightness, temperature, pressure, or image capturing) are performed in a CRFID tag, the amount of electromagnetic energy needed for each operation is different. Furthermore, the CRFID tag may have a consecutive operation feature that requires the CRFID tag to continue transmitting sensing results to the reader unlike an RFID tag that does not perform a separate operation after a successful recognition. If the CRFID tag receives electromagnetic energy from the reader whenever a frame starts, it performs a periodical operation for each tag. Furthermore, the CRFID tag has a processing delay time taken to generate data because it senses a surrounding environment, processes corresponding results into data, and sends the data.

That is, the CRFID tag has a processing delay time and an operation cycle feature. If an existing RFID tag recognition method is applied in order to recognize the CRFID tag, performance is deteriorated due to the features. Accordingly, there is a need for an efficient tag recognition method for a CRFID tag.

Figure 2:
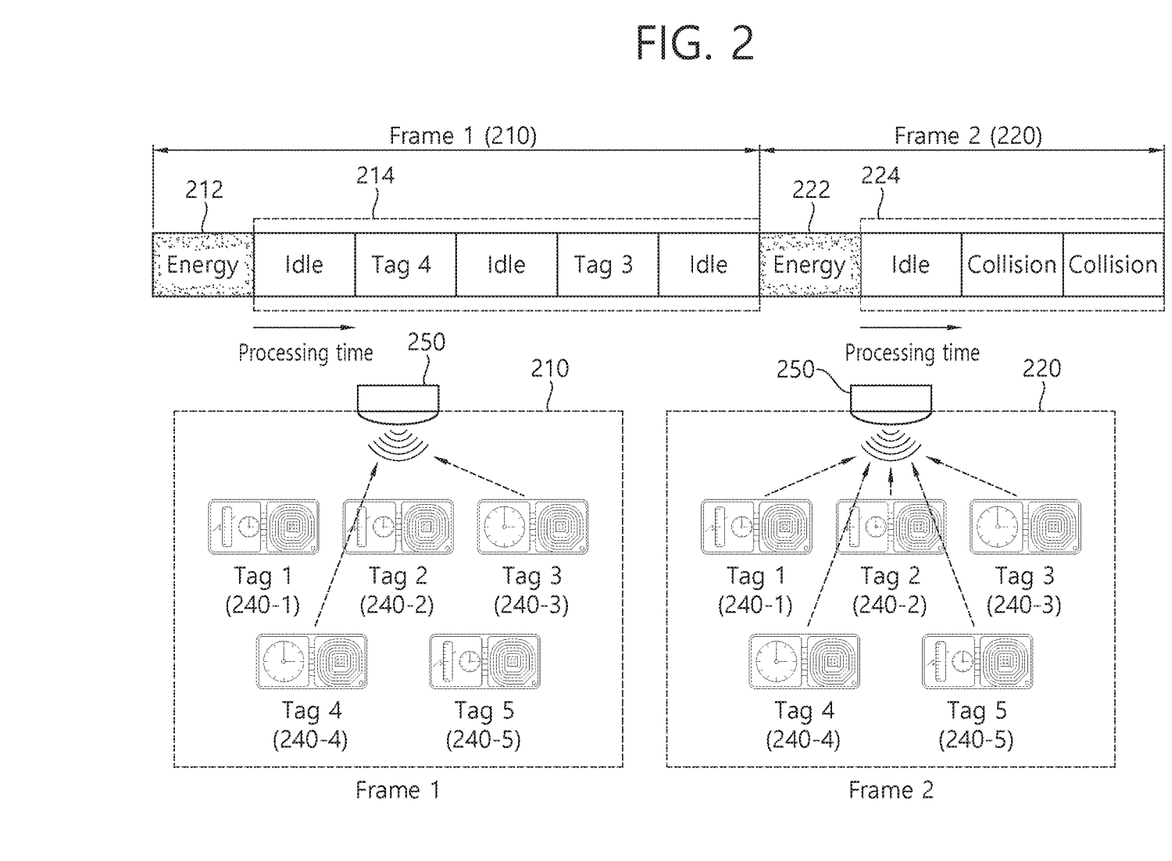
FIG. 2 is a concept diagram depicting an example of a conventional dynamic framed slotted ALOHA (DFSA) recognition method being used to recognize a CRFID tag.

FIG. 2 is a concept diagram depicting an example in of a conventional dynamic framed slotted ALOHA (DFSA) recognition method being used to recognize a CRFID tag.

Referring to FIG. 2, CRFID tags 240-1~240-5 receive a specific amount of electromagnetic energy from a reader 250 whenever each frame starts. It may be assumed that group 1 including the tag 1 240-1, the tag 2 240-2 and the tag 5 240-5, and group 2 including the tag 3 240-3 and the tag 4 240-4 are different types of the CRFID tags. That is, the tags in the group 1 are of the same type and the tags in the group 2 are of the same type but the tags in the group 1 and the tags in the group 2 are different types. Frames 210 and 220 include slots 212 and 222 for providing electromagnetic energy and time slots 214 and 224 for transmitting or receiving information.

In the frame 1 (210) of FIG. 2, five time slots 214 are assigned as a frame length because the reader 250 include the five tags 240-1~240-5. In the frame 1 (210), however, in view of the operation cycle feature of the CRFID tags 240-1~240-5, the tag 1 (240-1), the tag 2 (240-2), and the tag 5 (240-5) do not perform a transmission operation because they require more electromagnetic energy for their operations. Accordingly, there occurs a phenomenon in which resources are wasted because the time slots 214 is greater than the number of operating tags allocated. In the frame 2 (220), three time slots 224 are assigned as a frame length by taking into consideration the number of tags recognized by the reader 250. However, time slots smaller than the number of operating CRFID tags are allocated based on consecutive operations and operation cycle features of the CRFID tags 240-1~240-5. Accordingly, collisions are frequently generated. Furthermore, there occurs a phenomenon in which the first slot of each frame is wasted without being used as a slot used by the CRFID tags 240-1~240-5 due to the processing delay time characteristic of the CRFID tags 240-1~240-5, thereby further wasting slot resources. Accordingly, in order to maximize a tag recognition ratio and increase efficiency, there's a need for a method for determining and matching a frame size to be identical with the number of operating tags.

Figure 3:
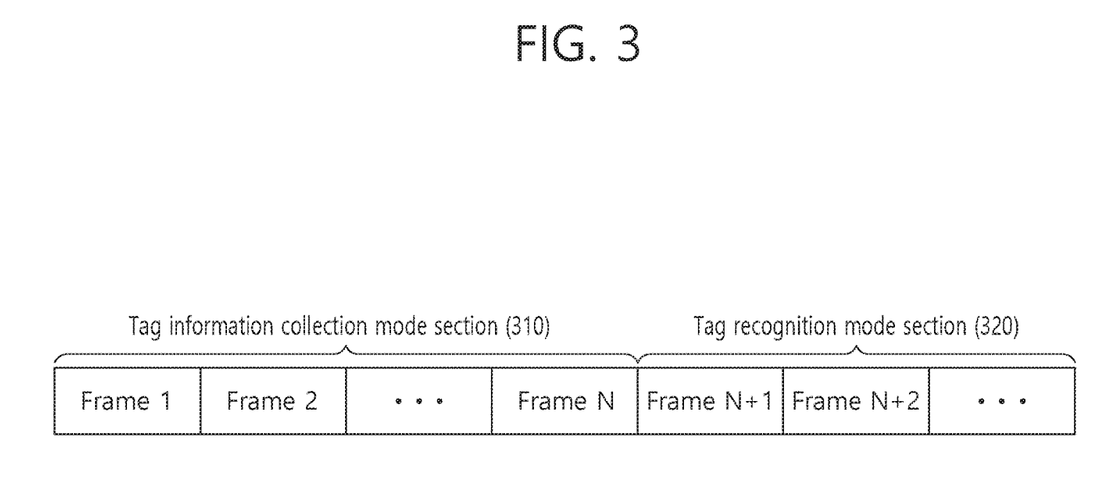
FIG. 3 is a diagram depicting examples of frame structures in a CRFID system.

FIG. 3 is a diagram depicting examples of frame structures in an RFID system. As shown in FIG. 3, the frames include frames for a tag information collection mode section 310 and frames for a tag recognition mode section 320. In each of the frames, tags may determine a mode based on frame header information.

Referring to FIG. 3, a reader may manage different frames in two modes. The reader may transmit different frames to tags managed by the reader in a broadcast manner. The two modes may include a tag information collection mode 310 and a tag recognition mode 320. In the two modes, the length of a frame may be determined using different methods.

In the tag information collection mode 310, CRFID tag information is received. Furthermore, in accordance with another example, in the tag information collection mode 310, sensing data, together with tag information, is transmitted depending on the capability of the CRFID tag. In the tag information collection mode 310, assuming that the reader is aware of the number of tags now managed by the reader based on a user input or preset information, the reader may determine the length of a frame so that the frame includes slots corresponding to the number of tags managed by the reader. Furthermore, when all of the number of predetermine tags are successful in transmitting tag information, the reader may switch to the tag recognition mode 320. In accordance with the example of FIG. 3, a first frame 1 to a frame N belong to the tag information collection mode 310, and the frames are allocated so that a plurality of tags transmits their tag information. If it is determined that all of the tags are successful in transmitting their tag information up to the frame N, the reader may starts tag recognition mode 320 from a frame N+1. The tag information may include operation cycle information and processing delay time information about each of the tags.

In the tag recognition mode 320, the reader receives tag information from each of tags and then receives sensing data from each of the tags. In this case, the reader may determine the length of a frame based on the tag information (i.e., the operation cycle information and processing delay time information about each of the tags) collected in the tag information collection mode 310.

Figure 4:
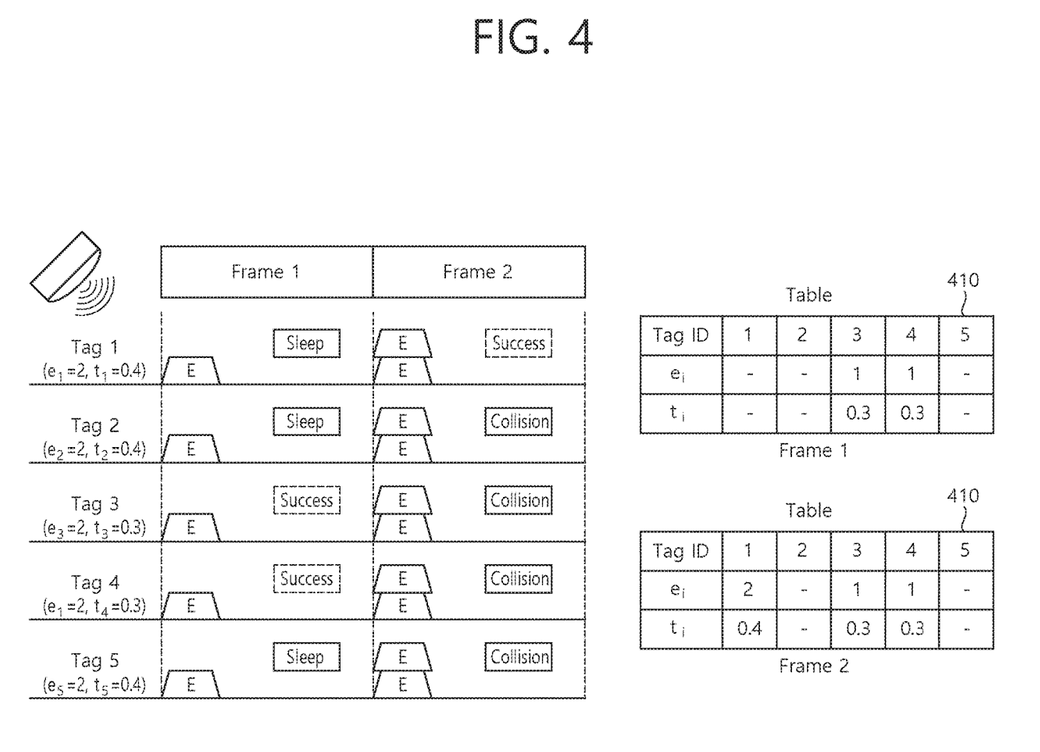
FIG. 4 is a concept view illustrating an example of a process of tag information recording, by a reader in a CRFID system, a table in a tag information collection mode.

FIG. 4 is a concept view illustrating an example of a process of tag information recording, by a reader in an RFID system, a table in a tag information collection mode.

Referring to FIG. 4, the reader provides electromagnetic energy to CRFID tags in every frame and manages a table for storing tag information. The CRFID tag operates based on the electromagnetic energy provided by the reader, and has an operation cycle having a frame number of a specific integer multiple by taking sensing operation for each tag into consideration. More specifically, the operation cycle is determined based on the electromagnetic energy amount needed for sensing data and the electromagnetic energy amount provided from the reader. Furthermore, the reader may perform analog to digital conversion (ADC) on sensed data and then measure a processing delay time that is taken to generate a packet for transmission. Pieces of information about the operation cycle and processing delay time of an i-th tag are indicated by $e_i$ and $t_i$, respectively.

At the initial operation of a CRFID system, the reader operates in the tag information collection mode. In this case, the reader allocates the number of tags, set by a user, as a frame length. Tags 1, 2, and 5 have an operation cycle 2 (this means that the tag operates every two frames) and a processing delay time of 0.4. Tags 3 and 4 have an operation cycle 1 (this means that the tag operates every frame) and a processing delay time of 0.3. Accordingly, each of the tags may not attempt information transmission in a sleep mode depending on its electromagnetic energy state or may attempt information transmission. Each of the tags operates on a contention basis in one frame. When one tag transmits information in one slot, the information is successfully transmitted (such a slot is called a success slot). When a plurality of tags transmits information in one slot, the information may not be transmitted, and in such a case, called a collision slot.

In a frame 1, the tags 3 and 4 that have received electromagnetic energy of one unit from the reader perform data transmission and consume their entire electromagnetic energy. Both the tags 3 and 4 are successful in data transmission. The reader receives information about the operation cycles $e_3$ and $e_4$ and processing delay times $t_3$ and $t_4$ of the tags 3 and 4, and stores them in a table 410. In accordance with an example of the present application, the reader provides tags with a frame length corresponding to the predetermined same number of tags in the tag information collection mode. Alternatively, the reader may allocate a frame length corresponding to the number of tags that need to transmit current tag information and from which the number of tags previously successful in the transmission of tag information has been subtracted. In the mode in which the reader transmits a response so that a tag is aware that the transmission of its own tag information has been successful, a successful tag will not transmit its own tag information until the mode switches the tag recognition mode. Accordingly, the reader may allocate a frame length corresponding to the number of tags from which the number of success tags has been subtracted by taking into consideration such a successful tag. If not, the tag may continue to transmit its own tag information regardless of whether the transmission of the tag information is successful in the tag information collection mode. Accordingly, the reader may allocate a frame length, corresponding to a maximum number of tags, in the tag information collection mode.

In the example of FIG. 4, in a frame 2, all of the tags operate according to their operation cycles, and information about the tag 1 which is successful in transmission is additionally recorded on the table 410. The reader operates in the tag information collection mode until information about the operation cycles and processing delay times of all of the tags is collected. When the information about the operation cycles and processing delay times of all of the tags is collected, the reader switches to the tag recognition mode and operates.

Figure 5:
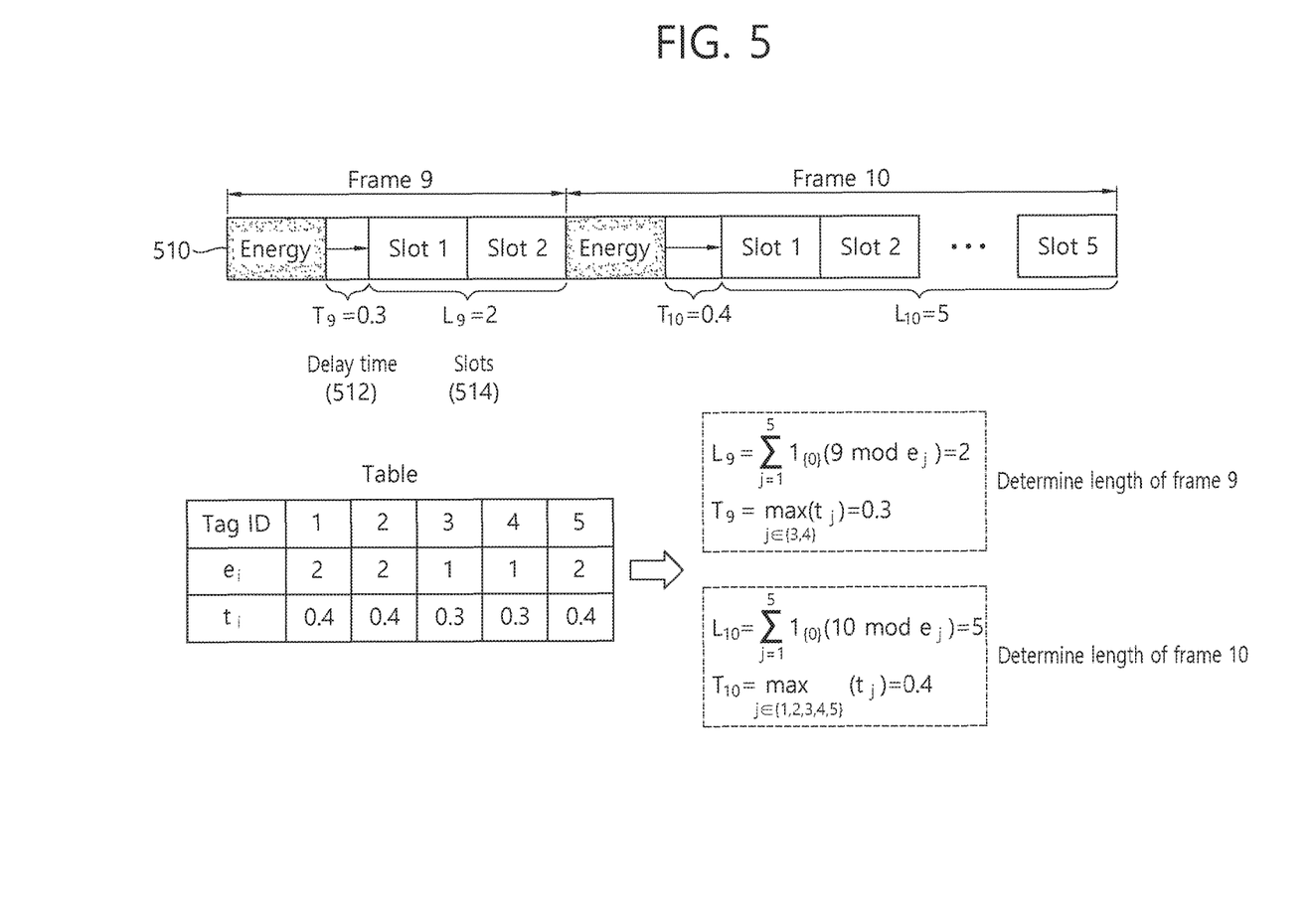
FIG. 5 is a concept diagram depicting an example of a process of operating in a tag recognition mode and recognizing a tag using a frame length and marginal section determined through specific computation in the structure of the frame.

FIG. 5 is a concept diagram depicting an example of a process of operating in the tag recognition mode and recognizing a tag using a frame length and marginal section determined through specific computation in the structure of the frame.

In the tag recognition mode, the reader determines an optimum frame length and a marginal section length prior to the start of a time slot based on recorded table information. The optimum frame length $L_i$ of an i-th frame may be determined through the following computation.

$$L_i = \Sigma_{j=1}^{N_{tag}} 1_{\{0\}} (i \bmod e_j) \quad (1)$$

In Equation 1, $N_{tag}$ is a total number of tags (the reader may be aware of the total number of tags through setting). $1_{\{0\}}$ is an indicator function, and indicates 1 if a value within "( )" satisfies a { } value. Equation 1 means that the length of a frame is determined by calculating all of the number of tags having an operation cycle of an integer multiple based on a frame index i.

Furthermore, the reader determines the length $T_i$ of a marginal section prior to the start of a time slot in the i-th frame through the following equation.

$$T_i = \max(t_j), j \text{ is a tag having a } 1_0(i \bmod e_j) \text{ value of } 1 \quad (2)$$

In accordance with Equation 2, the length $T_i$ of a marginal section prior to the start of a time slot in the i-th frame is determined to be a value of the longest processing delay time of a tag from among tags that operate in the i-th frame. Accordingly, all of the tags can be certainly guaranteed to prepare the transmission of data before a time slot starts.

Referring to FIG. 5, the reader collects information about all of tags and determines an optimum frame length $L_9$ and the length $T_9$ of a marginal section in a ninth frame based on the information. In the tag recognition mode, each of frames includes an electromagnetic energy transmission section 510 for transmitting electromagnetic energy to the tags and time slots 514 for transmitting or receiving actual data. Furthermore, in the tag recognition mode, each frame additionally includes a delay time section 512 in which a processing delay time within a tag has been taken into consideration between the electromagnetic energy transmission section 510 and the time slots 514. The delay time section 512 prevents the first slot or the initial slots of a frame from being wasted without being used due to the processing delay time in the tag.

In an example of the present application, the number of operating tags in the ninth frame is set to 2 and the length of a required marginal section is set to 0.3. Thereafter, likewise, in a tenth frame, an optimum frame length $L_{10}$ and the length $T_{10}$ of a marginal section in the ninth frame are set to 5 and 0.4, respectively. As described above, an optimum frame length and the length of a marginal section in each frame are determined by taking into consideration the operation cycle and processing delay time of each tag that is expected to actually operate in each frame. Accordingly, a tag recognition ratio can be improved, and a problem in that a time slot is wasted due to a processing delay time can be solved.

Figure 6:
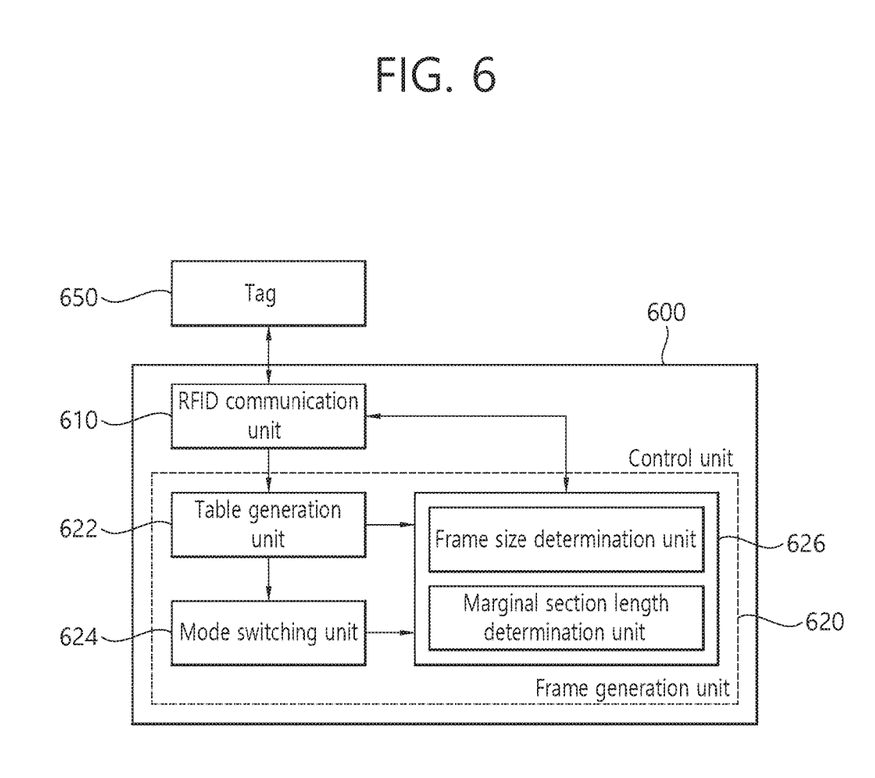
FIG. 6 is a block diagram schematically depicting an example of the configuration of the reader in the CRFID system.

FIG. 6 is a block diagram schematically depicting an example of the configuration of the reader in the RFID system. As shown in FIG. 6, the reader 600 includes an RFID communication unit 610 and a control unit 620. The RFID communication unit and the control unit may be implemented using a single hardware processor or a plurality of processors performing different functions.

Referring to FIG. 6, the RFID communication unit 610 receives tag information and/or sensing data from a tag 650 and transmit electromagnetic energy- and frame-related information to the tag 650. In this case, the frame-related information may include information about the length of a corresponding frame (i.e., information about the number of slots), mode ID information indicating whether a current mode is what mode and/or frame index information.

The control unit 610 includes a table generation unit 622, a mode switching unit 624, and a frame generation unit 626.

The table generation unit 622 generates a table by matching information about the ID of each of tags and tag information based on the tag information received through the RFID communication unit 610. The table generation unit 622 may perform a task for generating the table until all of the columns of the table are filled based on tag columns (or rows) corresponding to the predetermined number of tags.

If the table for all of the tags has been completed by the table generation unit 624, that is, tag information about all of the tags has been received, the mode switching unit 624 functions to switch an operation mode from the tag information collection mode to the tag recognition mode. The mode switching unit 624 is aware of the number of tags managed by the reader, and may determine whether tag information is collected from all of the managed tags and change the operation mode based on a point of time at which the collection of the tag information from the tags is completed. In some of the examples, the mode switching unit 624 may switch the operation mode from the tag recognition mode to the tag information collection mode in a specific cycle. For example, if 10 frames have been set to be allocated in the tag recognition mode, the mode switching unit 624 may switch the operation mode from the tag information collection mode to the tag recognition mode, may allocate the 10 frames as frames corresponding to the tag recognition mode, and may switch the operation mode from the tag recognition mode to the tag information collection mode again. The reason for this is that it is necessary to adjust tag information again because the tag information may be changed or a new tag may be added. Such a switching operation from the tag recognition mode to the tag information collection mode may be automatically performed after a user first set the number of frames or may be manually performed by a user who inputs a forced mode change.

The frame generation unit 626 may generate a frame broadcasted to each of tags. The frame generation unit 626 may check a current mode by receiving information relating to whether the mode is to be switched from the mode switching unit 624. Next, the frame generation unit 626 may generate frames using different methods according to respective modes. The frame generation unit 626 may include a frame size determination unit and a marginal section length determination unit. The frame size determination unit may determine the number of slots included in a corresponding frame. The size of a frame may be differently determined depending on a mode. For example, in the tag information collection mode, the frame size determination unit may determine the size of a frame so that the predetermined number of slots is included in the determined size of the frame. In the tag recognition mode, the frame size determination unit may determine the size of a frame based on the number of tags that are expected to operate in the corresponding frame through the operation cycle of each of the tags. The marginal section length determination unit operates in the tag recognition mode, and may determine an electromagnetic energy transmission section and the length of a delay time section between time slots by taking into consideration a delay time for the internal operation processing of each of tags.

Furthermore, the frame generation unit 626 may include a plurality of pieces of information necessary for a frame, for example, frame index information, slot length information within a frame, and mode ID information in the corresponding frame, and may transmit the corresponding frame to tags. The frame is included in the header part of the frame so that it can be recognized by each of the tags.

Furthermore, the frame generation unit 626 may configure a frame by including electromagnetic energy in each frame so that the frame is allocated to tags.

Figure 7:
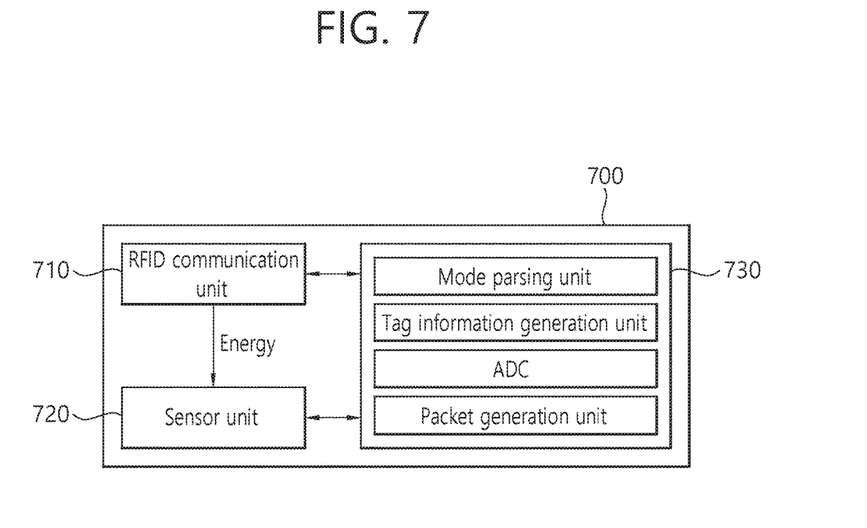
FIG. 7 is a block diagram schematically depicting an example of the configuration of a tag device in the CRFID system.

FIG. 7 is a block diagram schematically depicting an example of the configuration of a tag device in the RFID system. As shown in FIG. 7, the tag device 700 according to an example includes an RFID communication unit 710, a sensor unit 720, and a control unit 730.

Referring to FIG. 7, the RFID communication unit 710 performs the transmission and reception of information and electromagnetic energy to and from the reader. The RFID communication unit 710 may receive information and electromagnetic energy related to a frame from the reader, and may transmit its own tag information and a sensing data packet to the reader. Electromagnetic energy received every frame is allocated to the sensor unit 720 and/or the control unit 730 so that they operate.

The sensor unit 720 is a module for sensing data, such as a temperature, pressure, a magnetic force, and gravity. The sensor unit 720 may include at least one of a temperature sensor, a rotation sensor, a moisture sensor, a contact failure sensor, a fuel sensor, a voltage/current sensor, an oxygen sensor, a number count sensor, a GPS sensor, an infrared sensor, a geomagnetic sensor, and an image capturing sensor.

The control unit 730 generates information to be transmitted to the reader based on tag information and/or sensing data. The control unit 730 may include a mode parsing unit, a tag information generation unit, an ADC, and a packet generation unit. The mode parsing unit may check a current RFID mode (i.e., whether a current RFID mode is the tag information collection mode or the tag recognition mode) by parsing a frame (or the header of the frame) received from the reader. Furthermore, the mode parsing unit may make a frame index an ID and perform control so that a sensing data packet is transmitted through a frame corresponding to an operation cycle. The tag information generation unit may measure the time taken for the sensor unit 720 of the tag device itself to perform a sensing operation, and may generate operation cycle information based on the measured time. Furthermore, the tag information generation unit may measure the time taken for the ADC and the packet generation unit to generate analog sensing data into a digital data packet, and may generate processing delay time information based on the measured time. The ADC may convert analog sensing data into digital data. The packet generation unit may function to generate a data packet by packetizing digital sensing data.

Figure 8:
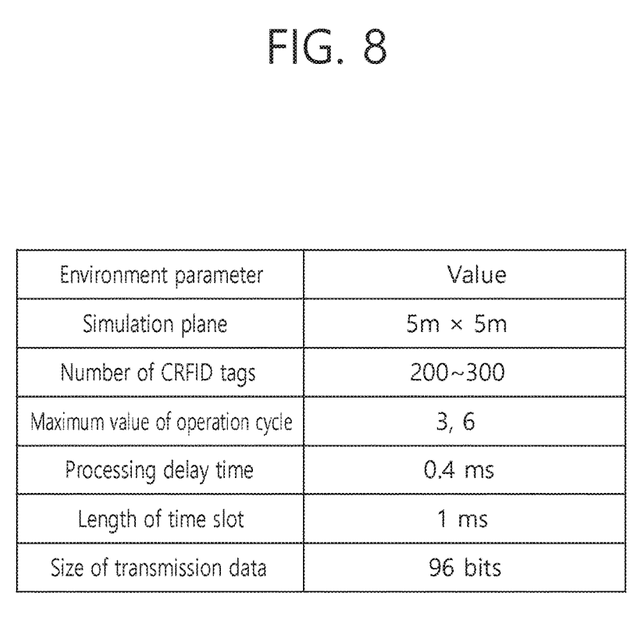
FIG. 8 is a table depicting an example of simulation environment parameters used to evaluate performance of a CRFID tag recognition method.

FIG. 8 is a table depicting an example of simulation environment parameters used to evaluate performance of an RFID tag recognition method.

Referring to FIG. 8, 200~300 tags were deployed in a 5 m×5 m plane, and performance of the tags were evaluated. Each tag was set to have a specific value between 1 and a maximum value in each situation by taking into consideration an environment in which maximum values of the operation cycle of the tag was 3 and 6. The processing delay time of each of the tags was considered to 0.4, and the length of a time slot was considered to be 1 ms.

Figure 9A:
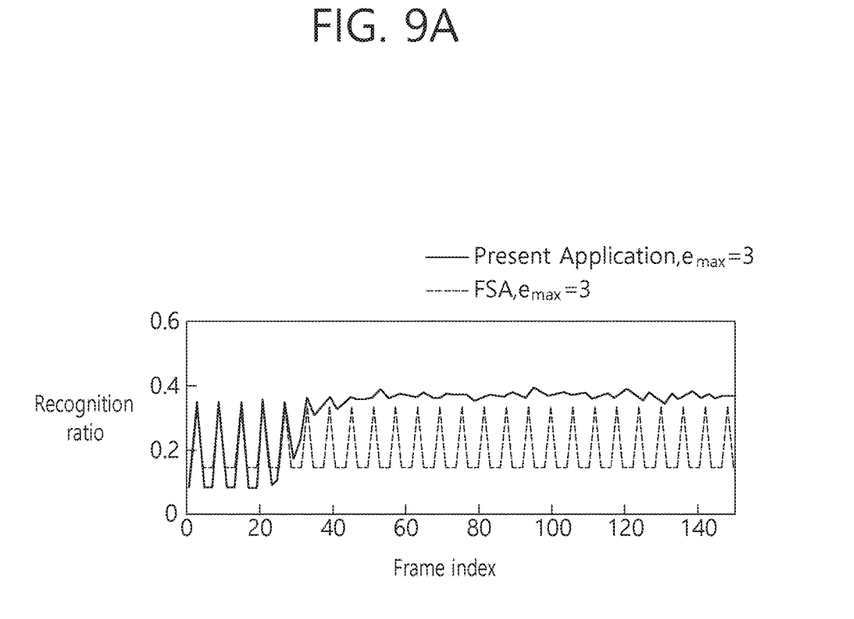
FIGS. 9A and 9B are graphs depicting examples of changes in the CRFID tag recognition ratio.
Figure 9B:
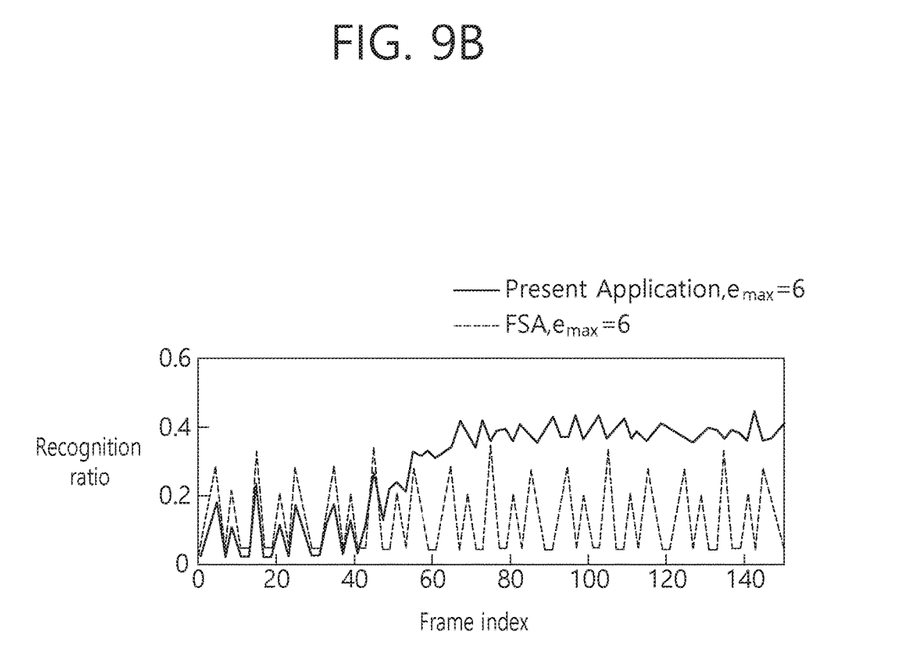

FIGS. 9A and 9B are graphs depicting examples of changes in the CRFID tag recognition ratio according to the progress of a frame.

Referring to FIGS. 9A and 9B, a tag recognition ratio of a DFSA method is compared with a CRFID tag recognition method of present application, where the maximum values of the operation cycle of the tag are 3 and 6.

If the DFSA method was applied, it was found that the tag recognition ratio changed without having a constant value. In contrast, if the CRFID tag recognition method according to examples of the present application was applied, it was found that the collection of tag information by the reader was completed as the frame was in progress, the tag operated in the tag recognition mode, and a tag recognition ratio maintained a relatively high value.

In FIG. 9B, if a maximum value of the operation cycle of a tag is 6, a tag recognition ratio converges relatively late. The reason for this is that as the operation cycle of the tag is lengthened, the time taken to collect information about all of tags may be increased.

Figure 10:
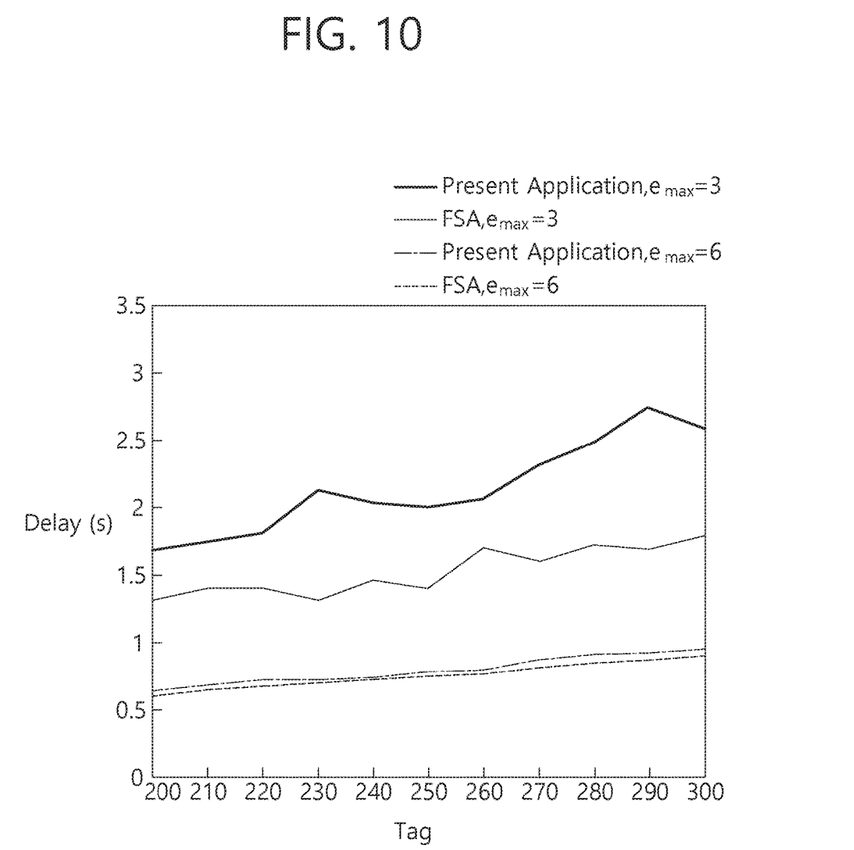
FIG. 10 is a graph depicting an example of a change in the average data transmission delay time of a tag according to the number of CRFID tags.

FIG. 10 is a graph depicting an example of a change in the average data transmission delay time of a tag according to the number of CRFID tags.

From FIG. 10, it was found that if the CRFID tag recognition method was applied, the delay time is small compared to the existing method using DFSA. Furthermore, in all the cases, if a maximum value of the operation cycle of a tag is great, a data transmission delay time is increased. The reason for this is that the time during which a tag cannot operate is increased.

In accordance with the reader in the RFID system, the operating method of the reader, the tag device, and the operating method of the tag device according to the examples of the present application, there is an advantage in that a recognition delay time is reduced through efficient tag recognition into which the characteristics of a CRFID tag have been incorporated when a tag is recognized in a future CRFID system using a reader.

The sensor unit 110, the RFID unit 120, RFID communication unit 610, and the control unit 620 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2, 8, 9A, and 9B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An operating method of a reader in a radio frequency identification (RFID) system, comprising:
   operating in a tag information collection mode to receive tag information from a plurality of tags using an RFID communication unit of the reader; and
   operating in a tag recognition mode using a frame allocated based on the tag information using the RFID communication unit of the reader, wherein a size of the frame is calculated based on the tag information and a quantity of tags that are to operate in the frame,
   wherein the tag information comprises processing delay time information about each of the tags.

2. The operating method of claim 1, wherein lengths of frames in the tag information collection mode and the tag recognition mode are determined using different methods.

3. The operating method of claim 1, wherein a size of a frame allocated in the tag information collection mode is determined based on information about a quantity of the plurality of tags.

4. The operating method of claim 1, wherein the tag information further comprises operation cycle information $e_i$.

5. The operating method of claim 4, wherein the operation cycle information $e_i$ is determined by an electromagnetic energy amount for sensing data and the processing delay time information $t_i$ is determined in accordance with a processing of sensing data in each tag.

6. The operating method of claim 1, further comprising switching from the operating in the tag information collection mode to the operating in the tag recognition mode in response to a predetermined number of tags successfully transmitting the tag information.

7. The operating method of claim 1, further comprising determining an optimum frame length and a marginal section length before time slots start in the tag recognition mode based on the tag information.

8. The operating method of claim 1, further comprising recording the tag information received from each of the tags in a table form.

9. The operating method of claim 1, wherein the operating in the tag recognition mode further comprises determining an optimum frame length by calculating a number of all of tags having an operation cycle of an integer multiple based on a frame index i of an integer multiple based on operation cycle information about each of the tags.

10. The operating method of claim 1, further comprising determining a longest processing delay time of a tag of tags operating in a specific frame to be a marginal section length before time slots start.

11. The operating method of claim 1, wherein the frame comprises:
    a slot which provides electromagnetic energy to the plurality of tags,
    a plurality of slots which collects information from the plurality of tags, and
    a marginal section between the slot which provides electromagnetic energy and the plurality of slots which collects information.

12. The operating method of claim 1, wherein the operating in the tag information collection mode comprises receiving sensing data along with the tag information from each of the tags.

13. The operating method of claim 1, wherein the operating in the tag recognition mode further comprises determining a frame length by:
    calculating a first quantity indicating tags having an operation cycle of a first integer;
    calculating second quantity indicating tags having an operation cycle of a second integer;
    determining a quantity of tags that are to operate in the frame based on the first and second quantities; and
    determining a quantity of frame slots for collecting information from the tags based on the quantity of tags that are to operate in the frame.

14. A reader in a radio frequency identification (RFID) system, comprising:
a processor configured to:
receive either one or both of tag information and a sensing data packet from a plurality of tags;
determine one of a plurality of operation modes for receiving data from the tag;
determine a frame size according to each of the operation modes;
operate in a tag information collection mode in which the tag information is collected; and
operate in a tag recognition mode using a frame allocated based on the tag information, wherein a size of the frame is calculated based on a quantity of tags that are to operate in the frame,
wherein the tag information comprises processing delay time information about each of the tags.

15. The reader in claim 14, wherein the processor comprises:
an RFID communication unit configured to receive either one or both of the tag information and the sensing data packet from the plurality of tags; and
a control unit configured to:
determine one of the plurality of operation modes for receiving data from the tag;
determine the frame size according to each of the operation modes; and
operate in the tag information collection mode and the tag recognition mode.

16. An operating method of a tag in a radio frequency identification (RFID) system, comprising:
receiving electromagnetic energy from a reader using an RFID communication unit of the tag;
generating either one or both of tag information and a sensing data packet in accordance with a frame allocated by the reader; and
transmitting either one or both of the tag information and the sensing data packet to the reader using the RFID communication unit of the tag,
wherein the reader controls the tag information to be generated in accordance with a frame in a tag information collection mode of the reader and controls the sensing data packet to be generated in accordance with a frame in a tag recognition mode of the reader,
wherein the tag information comprises processing delay time information about each of the tags.

17. The operating method of claim 16, further comprising, in accordance with the frame in the tag information collection mode, receiving electromagnetic energy from the reader and transmitting either one or both of the tag information and the sensing data packet to the reader.

18. The operating method of claim 16, wherein:
the tag information further comprises operation cycle information $e_i$, and
the tag information is determined by either one or both of an electromagnetic energy amount for sensing data and measuring a processing delay time taken to sense data and to packetize the sensed data.

19. A tag device in a radio frequency identification (RFID) system, comprising:
an RFID communication unit configured to receive electromagnetic energy from a reader and to transmit either one or both of tag information and a sensing data packet;
a sensor unit configured to sense data using the received electromagnetic energy; and
a control unit configured to generate the tag information in accordance with a frame in a tag information collection mode of the reader, and generate the sensing data packet in accordance with a frame in a tag recognition mode of the reader;
wherein the tag information comprises processing delay time information about each of the tags.

20. A radio frequency identification (RFID) system, comprising:
an RFID tag configured to:
receive electromagnetic energy from a reader,
transmit either one or both of tag information and a sensing data packet,
sense data using the received electromagnetic energy,
generate the tag information in accordance with a frame in a tag information collection mode of the reader, and
generate the sensing data packet in accordance with a frame in a tag recognition mode of the reader; and
an RFID reader configured to:
receive either one or both of the tag information and the sensing data packet from the RFID tag,
determine one of a plurality of operation modes for receiving data from the RFID tag,
determine a frame size according to each of the operation modes, and
operate in the tag information collection mode in which the tag information is collected,
operate in the tag recognition mode using a frame allocated based on the tag information, wherein a size of the frame is calculated based on a quantity of tags that are to operate in the frame,
wherein the tag information comprises processing delay time information about each of the tags.

21. An operating method of a radio frequency identification (RFID) system, comprising:
allocating, by a reader, a length of a frame corresponding to a quantity of tags capable of operating in a tag information collection mode to the tags;
transmitting, by RFID communication units of at least some of the tags, respective tag information to the reader in the frame of the tag information collection mode;
switching, by the reader, to a tag recognition mode after receiving tag information from each of the tags;
allocating a frame of a tag recognition mode of a size corresponding to a quantity of tags that are to operate in the frame of a tag recognition mode to at least some of the tags based on the received tag information in the tag recognition mode;
generating, by at least some of the tags, sensing data in a packet form; and
transmitting, by the RFID communication units of at least some of the tags, the sensing data packet to the reader in the frame of the tag recognition mode;
wherein the tag information comprises processing delay time information about each of the tags.

* * * * *